(12) United States Patent
Jiang

(10) Patent No.: US 11,559,734 B2
(45) Date of Patent: Jan. 24, 2023

(54) SURFACE ORIENTATION SENSING STRUCTURE AND INTELLIGENT MAGIC CUBE

(71) Applicant: GUANGZHOU GANYUAN INTELLIGENT TECHNOLOGY CO., LTD., Guangzhou (CN)

(72) Inventor: Ganyuan Jiang, Guangzhou (CN)

(73) Assignee: GUANGZHOU GANYUAN INTELLIGENT TECHNOLOGY CO., LTD., Guangzhou (CN)

( * ) Notice: Subject to any disclaimer, the term of this patent is extended or adjusted under 35 U.S.C. 154(b) by 106 days.

(21) Appl. No.: 17/155,100

(22) Filed: Jan. 22, 2021

(65) Prior Publication Data

US 2022/0008817 A1    Jan. 13, 2022

(30) Foreign Application Priority Data

Jul. 12, 2020  (CN) .......................... 202010666074.4

(51) Int. Cl.
*A63F 9/08*    (2006.01)
*A63F 9/06*    (2006.01)

(52) U.S. Cl.
CPC .......... *A63F 9/0842* (2013.01); *A63F 9/0612* (2013.01)

(58) Field of Classification Search
CPC ................ A63F 9/0842; A63F 9/0612; A63F 2009/2442; A63F 9/0826
See application file for complete search history.

(56) References Cited

U.S. PATENT DOCUMENTS

| 11,077,359 | B1 * | 8/2021 | Wigh | A63F 9/0842 |
| 11,311,795 | B1 * | 4/2022 | Lee | A63F 9/0842 |
| 2008/0237981 | A1 * | 10/2008 | Gilles | A63F 9/0842 |
| | | | | 273/153 S |
| 2018/0161668 | A1 * | 6/2018 | Chen | A63F 9/0842 |
| 2018/0311566 | A1 * | 11/2018 | Shin | A63F 9/0838 |
| 2019/0184275 | A1 * | 6/2019 | Su | A63F 9/08 |
| 2019/0374849 | A1 * | 12/2019 | Limaye | A63F 9/0842 |
| 2020/0009451 | A1 * | 1/2020 | Dor | A63F 13/35 |
| 2020/0346103 | A1 * | 11/2020 | Dor | A63F 9/0842 |

FOREIGN PATENT DOCUMENTS

| CN | 104874178 A | * | 9/2015 | |
| CN | 113624116 A | * | 11/2021 | |
| GB | 2597115 A | * | 1/2022 | ........... A63F 9/0612 |
| WO | WO-2017113578 A1 | * | 7/2017 | ............... A63F 9/08 |

\* cited by examiner

*Primary Examiner* — Steven B Wong

(57) ABSTRACT

The present invention discloses a surface orientation sensing structure, where six printed circuit boards are combined to form a regular hexahedron as the axis of an intelligent magic cube, and a main control chipset can recognize layer rotation by simply sweeping a copper foil through a brush sheet to cause a level change, so that the position change of the layer can be recognized more accurately, a step loss rate is reduced, parts are reduced, and the assembly process is simplified. The present invention further discloses an intelligent magic cube, where all the parts related to orientation sensing are concentrated on the axis, so that the intelligent magic cube can be operated more easily and smoothly, the intelligent functions of the intelligent magic cube can be used more smoothly, and user experience is improved.

8 Claims, 10 Drawing Sheets

SURFACE ORIENTATION SENSING STRUCTURE AND INTELLIGENT MAGIC CUBE

TECHNICAL FIELD

The present invention relates to the field of intellectual toys having elements movable between each other, and in particular, to an intelligent magic cube having reminding and recording functions, and a central shaft structure of the intelligent magic cube.

BACKGROUND

A magic cube is a very popular intellectual toy that has a simple structure and is changeable. A conventional third-order cube is composed of one central shaft, six central blocks connected to the central shaft, 12 edge blocks embedded between every two central blocks, and eight corner blocks embedded among every three edge blocks.

The conventional third-order magic cube has the following disadvantages:

(1) The magic cube is changeable; and it is difficult to solve the magic cube without knowing the complicated formulas, which cannot be easily remembered.
(2) It is difficult to time accurately. In current magic cube solving competitions, players need to press the button to stop the timer after the cube is solved, so there will always be a timing error of about 0.5 seconds.
(3) It is inconvenient for the players to perform technical communication with each other. Because of hand occlusion during the solving operation, it is difficult for bystanders or cameras to observe the complete operation process. In addition, it is difficult to record the solving steps.

To resolve the above-mentioned technical problems, the prior art provides an intelligent magic cube with reminding and recording functions, which is disclosed in WO/2016/173476. However, the intelligent magic cube has the following disadvantages:

(1) There are many electronic accessories and plastic parts, therefore the magic cube is heavy, and the players cannot operate the magic cube quickly.
(2) The assembly process is complex, resulting in a high manufacturing cost and inconvenience for the user to disassemble and debug.
(3) Due to excessive layout of parts related to surface orientation sensing, sensing errors are easy to occur, which results in main control judgment errors in the intelligent magic cube and affects the user experience.
(4) A surface orientation sensor of the intelligent magic cube, that is, a physical detection module circuit in the prior art, is generally installed in a central block, and consequently, the user cannot adjust the axis and the floating amplitude of the intelligent magic cube by using the axis floating elasticity adjustment system disclosed in the prior application CN210384805U.
(5) Various sensors and surface orientation detection mechanisms of the intelligent magic cube use wire welding and FPC flat wire welding, therefore the welding cost is high, the wire layout is disordered, and the intelligent magic cube cannot be normally used due to the fact that poor welding and wire breakage are easy to occur in long-term use.

SUMMARY

To resolve the above-mentioned technical problems, a first object of the present invention is to provide a surface orientation sensing structure, to reduce parts of an intelligent magic cube, improve sensing accuracy, and ensure high long-term use stability.

To resolve the above-mentioned technical problems, a second object of the present invention is to provide an intelligent magic cube, to enable a player of a magic cube to adjust the elasticity, the floating amplitude, and the positioning performance of the magic cube, so as to perform better during competition, while ensuring that the intelligent magic cube has a basic function of a conventional intelligent magic cube.

The first object of the present invention is implemented by using the following technical solution:

A surface orientation sensing structure, including:

six printed circuit boards, where the printed circuit boards are electrically connected to each other and form a regular hexahedron, the outer surface of each printed circuit board is provided with a circular copper foil with the center at the center of the printed circuit board, four arc-shaped copper foils with a common center and equal radius are provided at equal intervals on the periphery of the circular copper foil, and the circular copper foil and the arc-shaped copper foil have the same center; and six shafts, where the bottom of a shaft body is provided with a disc base, the bottom of the disc base is fixed with a chassis copper foil, and the chassis copper foil is provided with three brush sheets protruding toward one side of the printed circuit board side, namely a first brush sheet, a second brush sheet, and a third brush sheet; where a through-hole is formed at the center of the circle on the printed circuit board, a convex column corresponding to the through-hole and penetrating through the chassis copper foil is provided at the center of the bottom surface of the disc base, and the shaft is inserted into the through-hole through the convex column, so as to be rotatably mounted on the printed circuit board along a central axis thereof;

when the chassis copper foil is rotated with the shaft, the sweeping paths of the first brush sheet and the second brush sheet are located at the circular copper foil and the first brush sheet and the second brush sheet are electrically connected to the printed circuit board; in addition, the sweeping path of the third brush sheet covers the four arc-shaped copper foils, and when the third brush sheet sweeps the arc-shaped copper foils, the third brush sheet is electrically connected to the printed circuit board;

a main control chipset and a cell for supplying power to the main control chipset are provided in the regular hexahedron, the main control chipset is electrically connected to the circular copper foil, and when one of the shafts is rotated, the main control chipset receives a level change signal caused when the third brush sheet sweeps the arc-shaped copper foil; and the surface orientation sensing structure further includes a spherical cover formed by closing upper and lower semi-spherical covers, the regular hexahedron is provided in the spherical cover, and the shaft penetrates the spherical cover and extends beyond the spherical cover.

Further, the slit line of the spherical cover is located at the common horizontal plane of the four shafts, an upper semicircular tube and a lower semicircular tube are provided in each of the positions corresponding to the four shafts in the spherical cover, the upper semicircular tube is located at the upper semi-spherical cover, the lower semicircular tube is located at the lower semi-spherical cover, after the upper semi-spherical cover and the lower semi-spherical cover are closed, each upper semicircular tube and a corresponding lower semicircular tube are closed to form a circular tube for sleeving onto the shaft body, and each circular tube is sleeved with a spherical shaft.

Further, a cell slot for mounting a CR button cell is provided on the inner side of a printed circuit board on one surface of the regular hexahedron, and the spherical cover is provided with a cell access opening for removing or inserting the CR button cell at a position corresponding to the cell slot, and the bottom of the printed circuit board at the cell access opening is cut off.

Further, the surface orientation sensing structure includes a cell cover for the cell access opening.

The second object of the present invention is implemented by using the following technical solution:

An intelligent magic cube, including a central shaft, six central blocks connected to the central shaft, 12 edge blocks embedded between every two central blocks, and eight corner blocks embedded among every three edge blocks, where the central shaft is the surface orientation sensing structure.

Further, a protrusion is provided at the end of the shaft, and the protrusion is connected to the central block by an axis floating elasticity adjustment system.

Further, the corner block is provided with a first magnet on three sides adjacent to the edge block, and the edge block is provided with a second magnet corresponding to the first magnet on two sides adjacent to the corner block.

The present invention has the following advantages over the prior art:

(1) The six printed circuit boards are combined to form a regular hexahedron as the axis of the intelligent magic cube, and the main control chipset can recognize layer rotation by simply sweeping the copper foil through the brush sheet to cause a level change, so that the position change of the layer can be recognized more accurately, a step loss rate is reduced, parts are reduced, and the assembly process is simplified.

(2) All the parts related to surface orientation sensing are concentrated on the axis, and other functional components such as an axis floating elasticity adjustment system and a magnetic positioning system can be easily mounted in the corner block, the edge block and the central block of the magic cube, so that the intelligent magic cube can be operated more easily and smoothly, intelligent functions of the intelligent magic cube can be used more smoothly, and user experience is improved.

Figure 1:
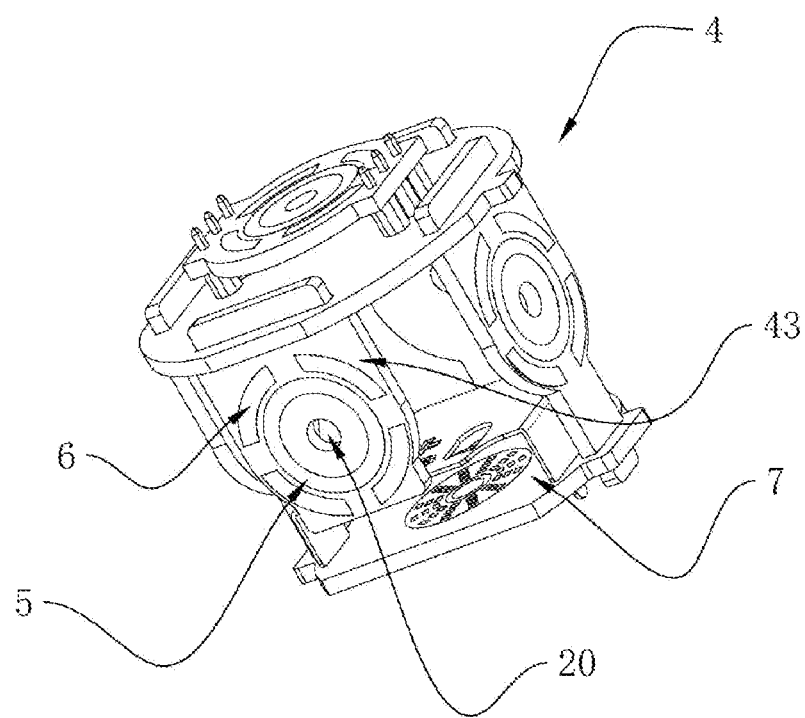
FIG. 1 is a three-dimensional view of a regular hexahedron formed by six printed circuit boards according to the present invention.
Figure 2:
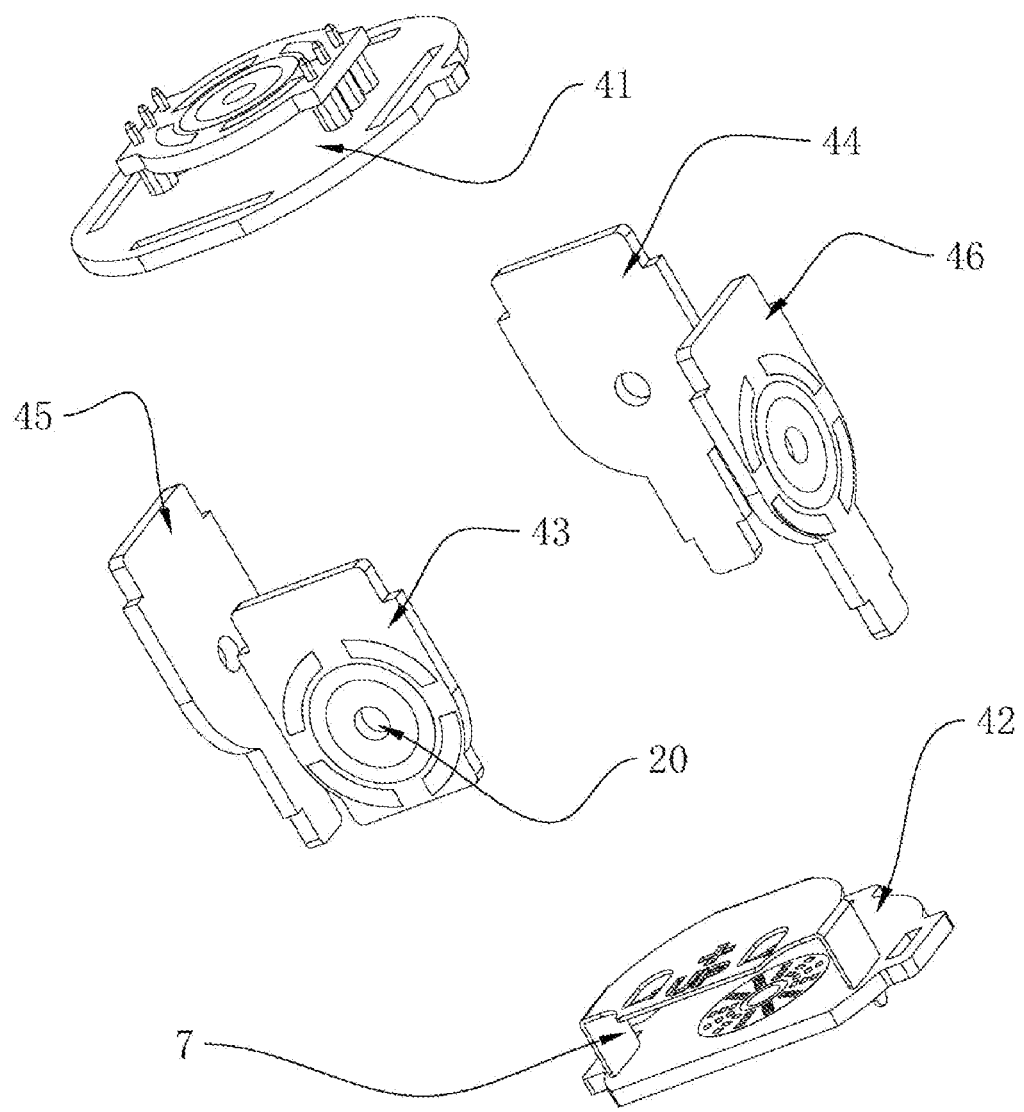
FIG. 2 is an exploded view of a structure of the regular hexahedron shown in FIG. 1.

Reference numerals: 1. Central block; 2. Edge block; 3. Corner block; 4. Regular hexahedron; 41. Top PCB; 42. Bottom PCB; 43. Front PCB; 44. Rear PCB; 45. Left PCB; 46. Right PCB; 5. Circular copper foil; 6. Arc-shaped copper foil; 7. Cell slot; 8. Spherical cover; 81. Upper semi-spherical cover; 82. Lower semi-spherical cover; 9. Cell access opening; 10. Cell cover; 11. Shaft; 111. Disc base; 112. Convex column; 113. Protrusion; 114. Shaft body; 12. Slit line; 13. Circular tube; 131. Upper semicircular tube; 132. Lower semicircular tube; 14. Spherical shaft sleeve; 15. Chassis copper foil; 151. First brush sheet; 152. Second brush sheet; 153. Third brush sheet; 16. First magnet; 17. Second magnet; 18. CR button cell; 19. Axis floating elasticity adjustment system; 20. Through-hole.

DESCRIPTION OF EMBODIMENTS

The technical solutions in the embodiments of the present invention will be clearly and completely described below with reference to the accompanying drawings. Apparently, the described embodiments are some rather than all of the embodiments of the present application.

It should be noted that if there are directional indications (such as upper, lower, left, right, front, rear, top, bottom, inner, outer, vertical, lateral, longitudinal, counterclockwise, clockwise, circumferential, radial, axial . . . ) in the embodiments of the present invention, the directional indication is used only to explain the relative positional relationship, movement, and the like between the components in a specific posture, and if the specific posture changes, the directional indication changes accordingly.

In addition, if the term "first" or "second" is used in the embodiments of the present invention, the term "first" or "second" is only used for illustrative purposes and cannot be understood as an indication or implication of relative importance or an implicit indication of the number of technical features. Therefore, the features defined with "first" and "second" may explicitly or implicitly include at least one of the features.

In addition, the technical solutions of the embodiments may be combined with each other, but the combination of the technical solutions should be able to be realized by a person of ordinary skill in the art. When the combination of technical solutions is contradictory or cannot be achieved, it should be considered that such a combination of technical solutions does not exist, and the combination of the technical solutions does not fall within the protection scope of the present invention.

The present invention provides a surface orientation sensing structure.

In an embodiment of the present invention, the surface orientation sensing structure includes six printed circuit boards (PCBs), and each PCB corresponds to one shaft 11, a spherical cover 8 formed by closing upper and lower semi-spherical covers 82, and a main control chipset provided on the PCB.

Specifically, as shown in FIG. 1 to FIG. 4, six PCBs are combined to each other to form a regular hexahedron 4, where the six PCBs include a top PCB 41, a bottom PCB 42, a front PCB 43, a rear PCB 44, a left PCB 45, and a right PCB 46. The six PCBs are electrically connected to each other. The outer surface of each PCB is provided with a circular copper foil 5 having a center at the center of the printed circuit board. Four arc-shaped copper foils 6 having a common center and an equal radius are provided at equal intervals on the periphery of the circular copper foil 5, and the circular copper foil 5 and the arc-shaped copper foil 6 have a common center. To supply power to the main control chipset, a cell slot 7 for mounting a CR button cell 18 is provided on one side that is of the bottom PCB 42 and that faces the interior of the regular hexahedron 4, and the part that is of the bottom of the front PCB 43 and that corresponds to the position of the cell slot 7 is cut off. The regular hexahedron 4 is disposed inside the spherical cover 8 formed by closing the upper and lower semi-circular spherical covers 82. A cell access opening 9 for removing or inserting the CR button cell 18 is provided on a position that is of the spherical cover 8 and that corresponds to the position of the cell slot 7. A cell cover 10 is provided for the cell access opening 9.

Figure 3:
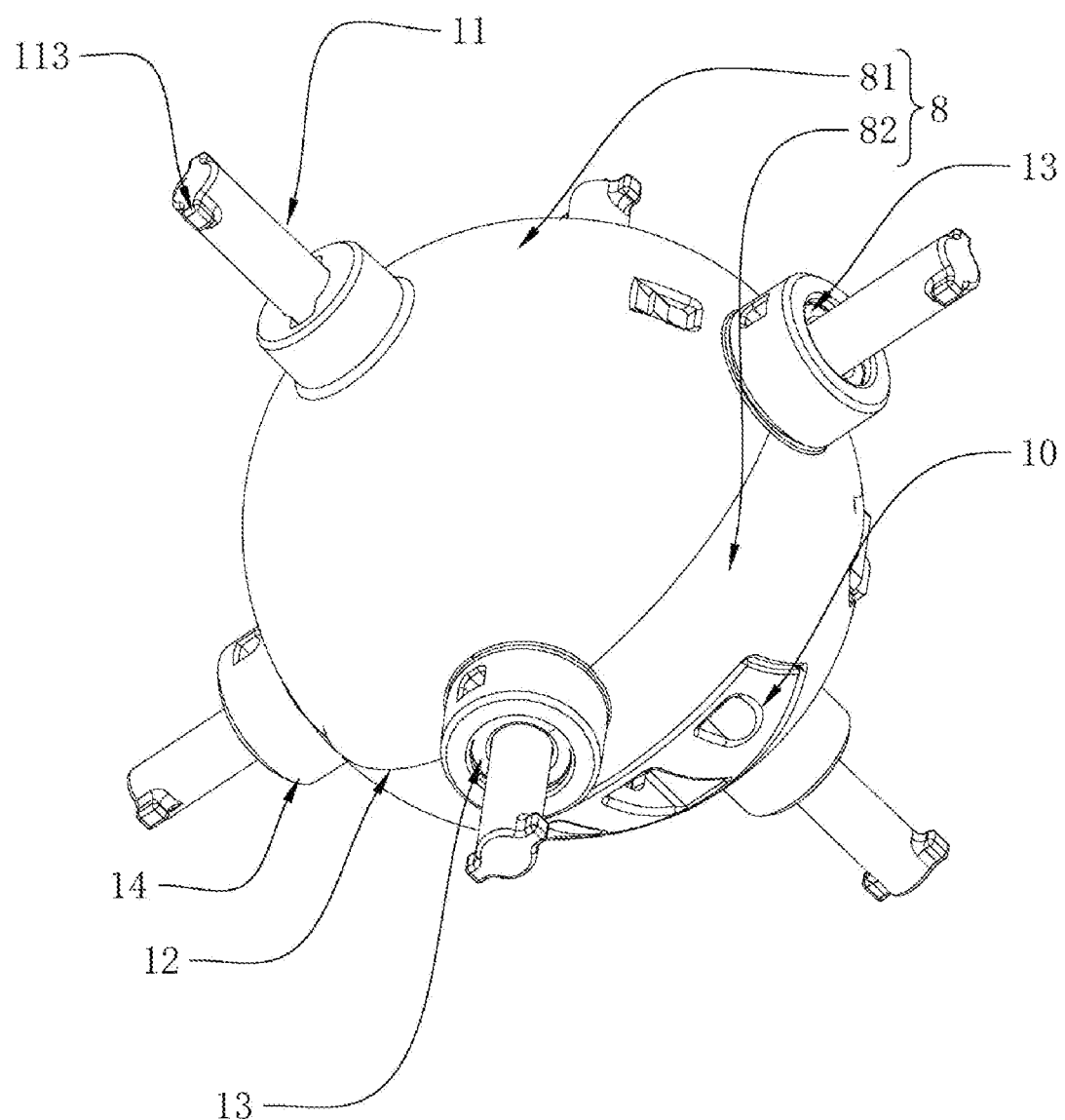
FIG. 3 is a three-dimensional view of a surface orientation sensing structure according to the present invention.
Figure 4:
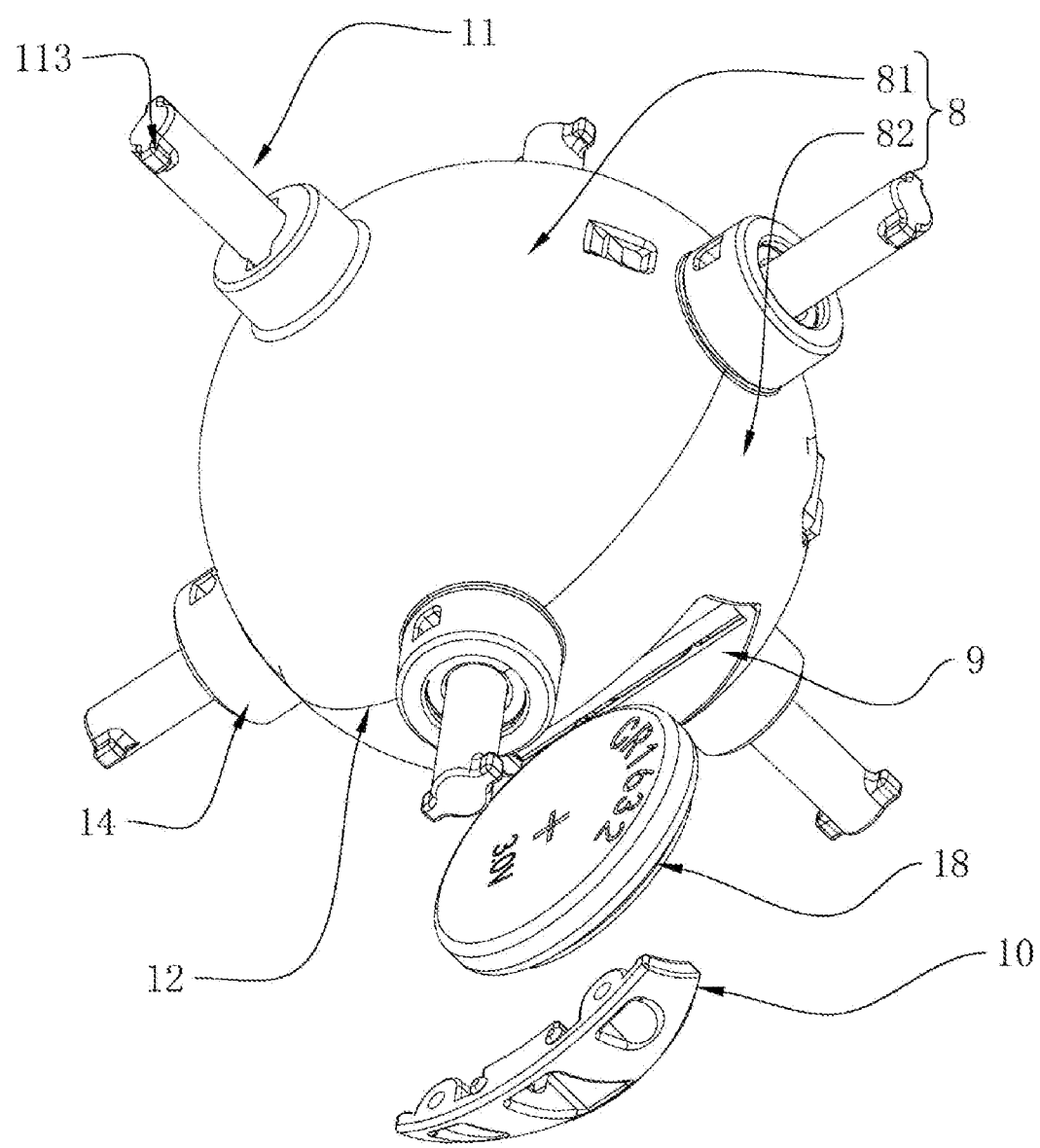
FIG. 4 is a schematic diagram of a structure of the surface orientation sensing structure without a cell according to the present invention.
Figure 5:
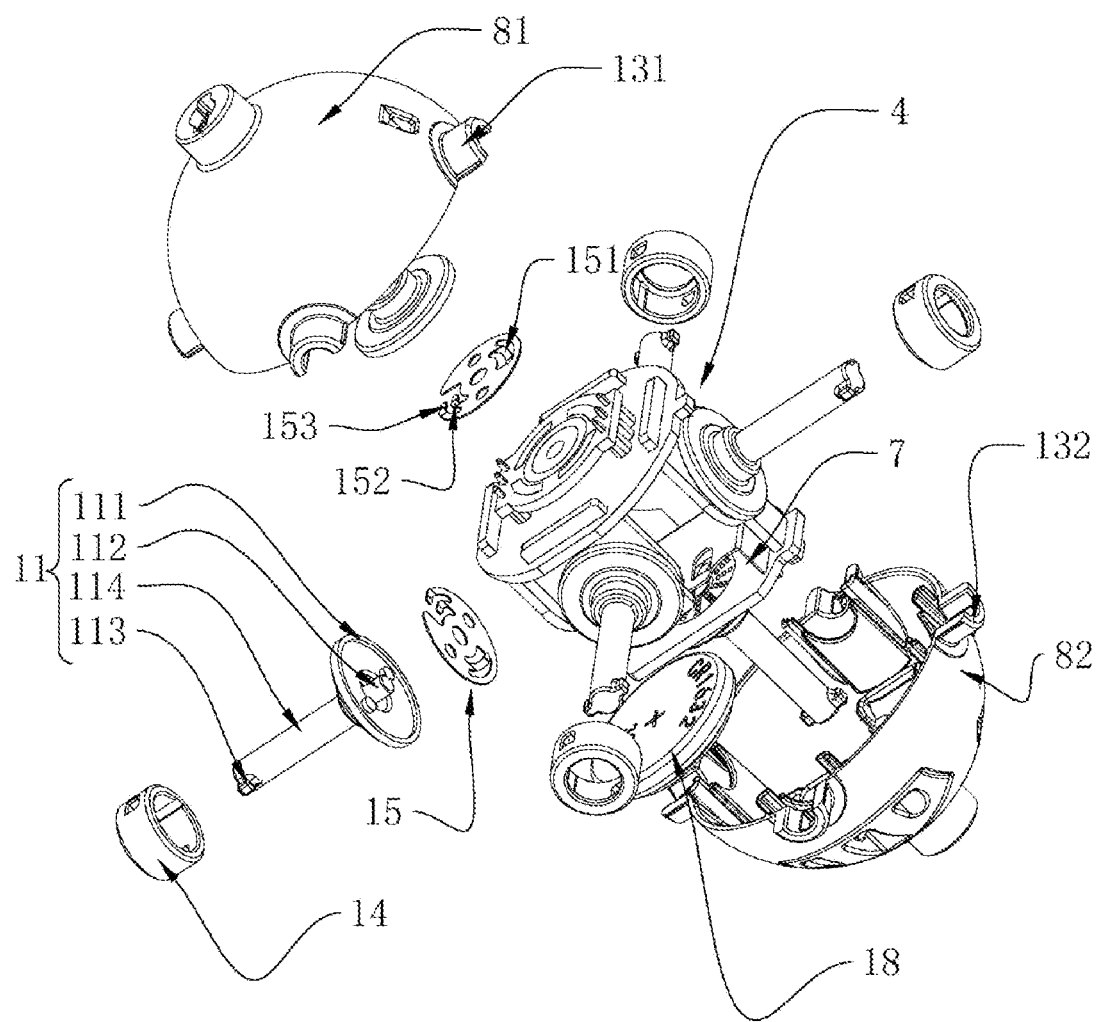
FIG. 5 is a schematic exploded view of some parts of the surface orientation sensing structure shown in FIG. 3.

Specifically, as shown in FIG. 3 to FIG. 5, a shaft body 114 of the shaft 11 penetrates the spherical cover 8 and extends beyond the spherical cover 8. A slit line 12 of the spherical cover 8 is located at the common horizontal plane of axes of shafts 11 corresponding to the front PCB 43, the rear PCB 44, the left PCB 45, and the right PCB 46. An upper semicircular tube 131 and a lower semicircular tube 132 are provided in each of the positions corresponding to the four shafts 11 in the spherical cover 8. The upper semicircular tube 131 is located at the upper semi-spherical cover 81. The lower semicircular tube 132 is located at the lower semi-spherical cover 82. After the upper semi-spherical cover and the lower semi-spherical cover 82 are closed, each upper semicircular tube and a corresponding lower semicircular tube 132 are closed to form a circular tube 13 for sleeving onto the shaft body 114 of the shaft 11, and each circular tube 13 is sleeved with a spherical shaft sleeve 14.

Specifically, as shown in FIG. 5, a disc base 111 is provided at the bottom of a shaft body 114 of each shaft 11, a chassis copper foil 15 is fixed to the bottom surface of each disc base 111, three brush sheets protruding toward one side of the PCB are provided on the chassis copper foil 15, and the three brush sheets include a first brush sheet 151, a second brush sheet 152, and a third brush sheet 153. A through-hole 20 is provided at the center of each circular copper foil 5. A convex column 112 corresponding to the through-hole 20 and penetrating through the chassis copper foil 15 is provided at the center of the bottom surface of the disc base 111. Each shaft 11 is inserted into the through-hole 20 through the convex column 112, so as to be rotatably mounted on the respective corresponding PCB along the central axis thereof. When the chassis copper foil 15 is rotated with the shaft 11, the sweeping paths of the first brush sheet 151 and the second brush sheet 152 are located at the circular copper foil 5 and the first brush sheet 151 and the second brush sheet 152 are electrically connected to the PCB. In addition, the sweeping path of the third brush sheet 153 covers the four arc-shaped copper foils 6, and when the third brush sheet 153 sweeps the arc-shaped copper foils 6, the third brush sheet 153 is electrically connected to the PCB. The third brush sheet 153 is not electrically connected to the PCB when it sweeps the gap between two arc-shaped copper foils 6.

Specifically, a main control chipset includes a level detection module, a data processing module, an operation and storage module, and a Bluetooth sending module. When one shaft 11 is rotated, the level detection module in the main control chipset receives a level change signal caused when the third brush sheet 153 on the chassis copper foil corresponding to the shaft 11 sweeps the arc-shaped copper foil 6.

The present invention further provides an intelligent magic cube.

Figure 6:
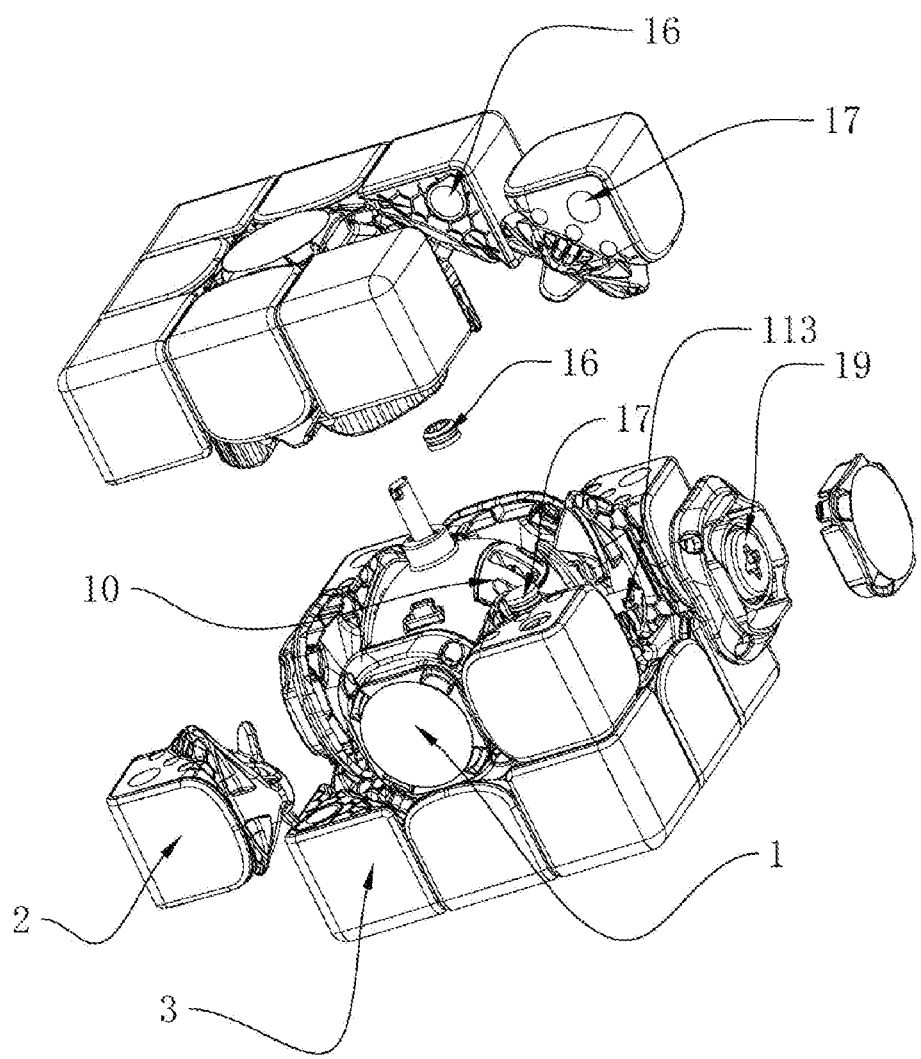
FIG. 6 is a schematic exploded view of some parts of an intelligent magic cube according to the present invention.

In an embodiment of the present invention, as shown in FIG. 6, the intelligent magic cube uses the surface orientation sensing structure of the present invention as a central shaft and further includes six central blocks 1 connected to the shaft 11 of the surface orientation sensing structure, 12 edge blocks 2 embedded between every two central blocks 1, and eight corner blocks 3 embedded among every three edge blocks 2. The corner block 3 is provided with a first magnet 16 on three sides adjacent to the edge block 2, and the edge block 2 is provided with a second magnet 17 corresponding to the first magnet 16 on two sides adjacent to the corner block 3. A protrusion 113 is provided at the end of the shaft 11, and is connected to the central block 1 through an axis floating elasticity adjustment system 19. For a specific structure and usage of the axis floating elasticity adjustment system 19, reference may be made to the prior publication No. CN210384805U. No repeated description is given here.

Figure 7:
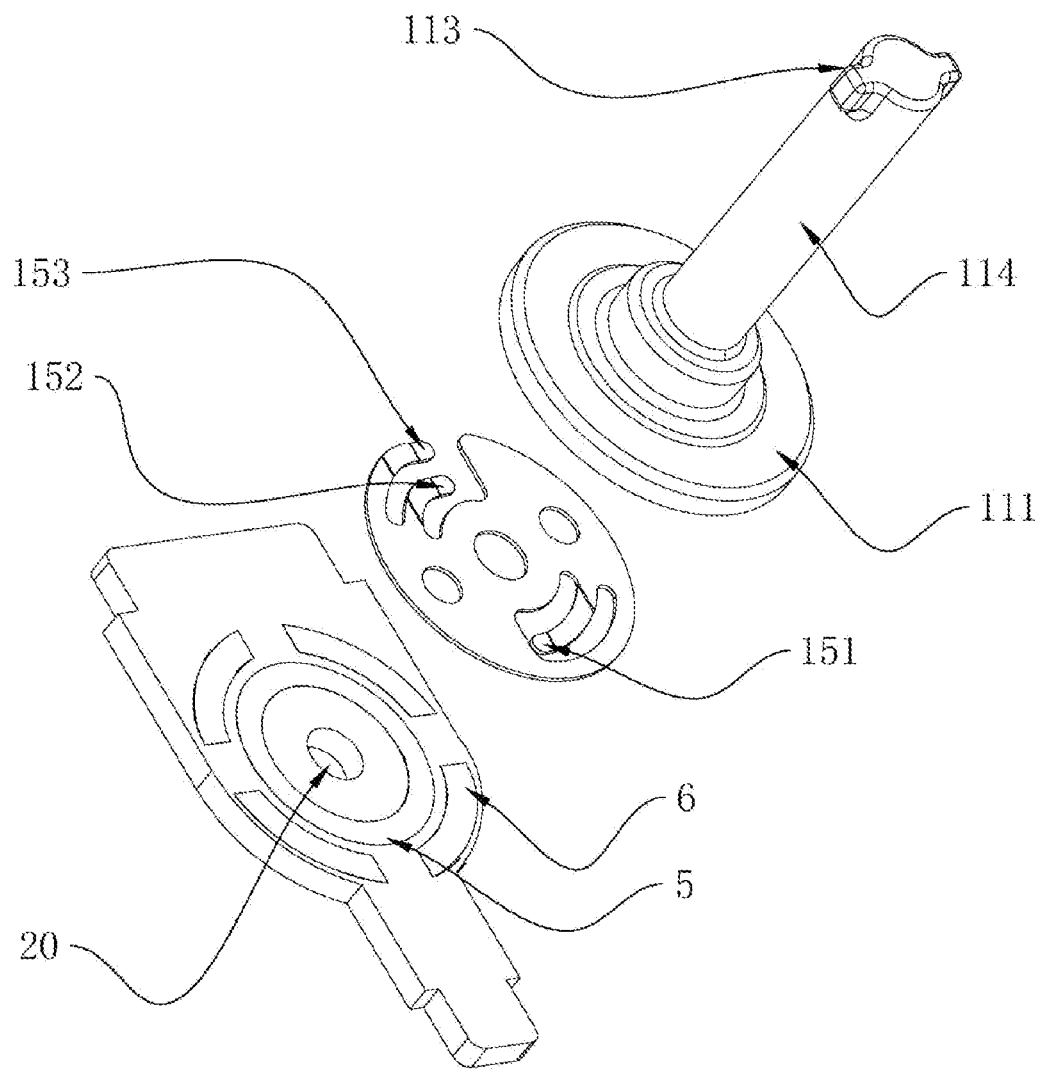
FIG. 7 is a block diagram of a circuit structure of a main control chipset and each detection position according to the present invention.
Figure 8:
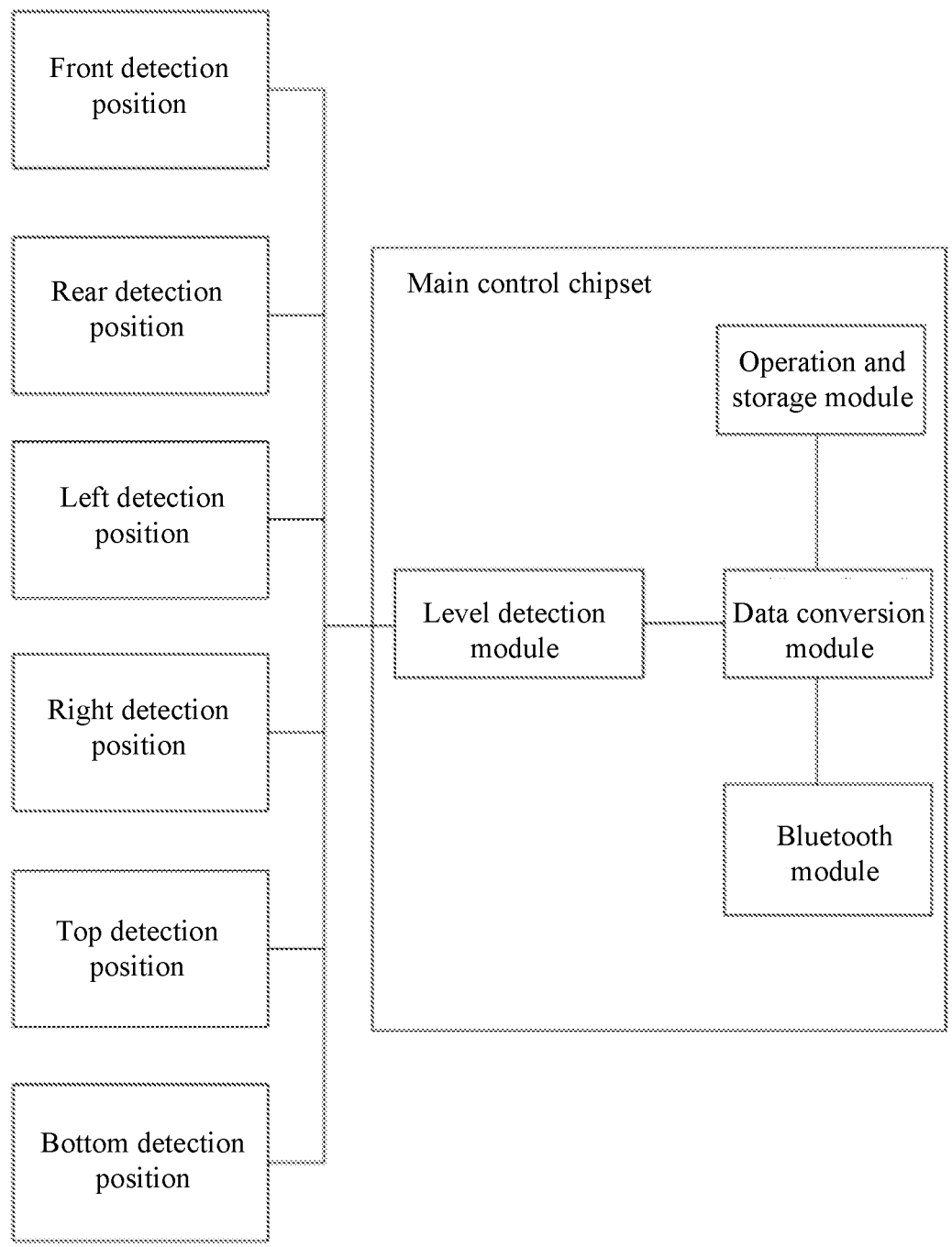
FIG. 8 is an exploded view of a structure of the detection position according to the present invention.

Specifically, as shown in FIG. 7, each PCB of the surface orientation sensing structure and its corresponding shaft 11, a circular copper foil 5 and four arc-shaped copper foils 6 on the PCB, and first 151, second 152, and third brush sheets 153 on the chassis copper foil 15 at the bottom of the shaft 11 together constitute a detection position. The circuit connection relationship between the detection position and the main control chipset is shown in FIG. 8.

Figure 9:
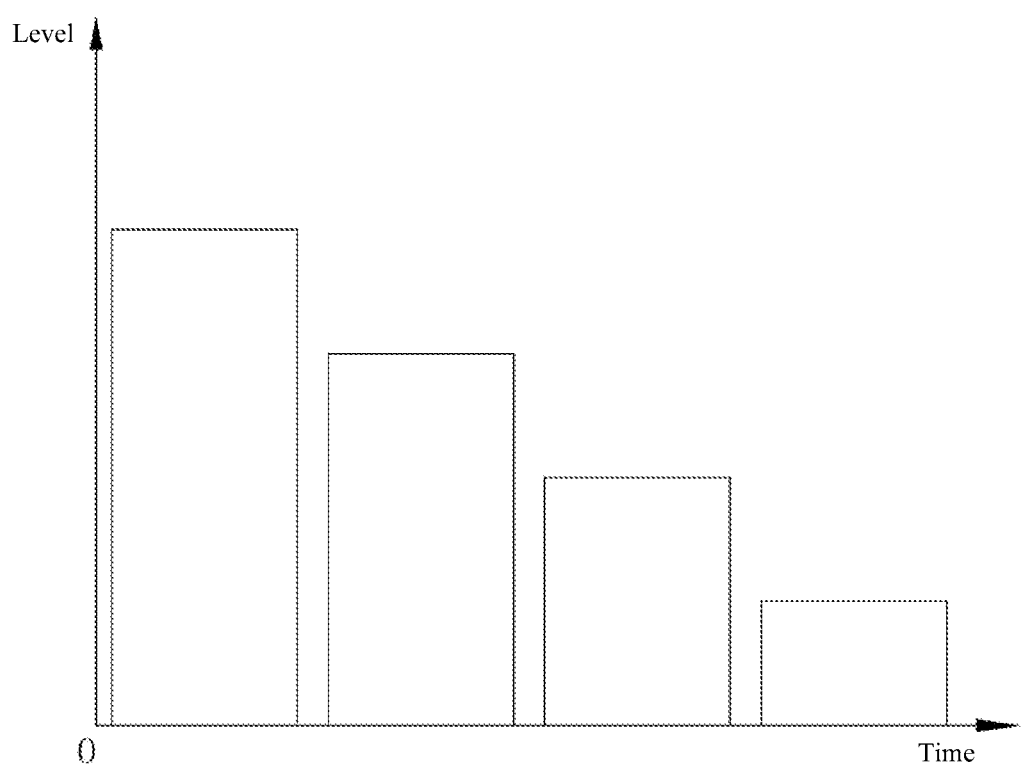
FIG. 9 is a diagram illustrating a level change detected by a main control chipset when a shaft is rotated by 360 degrees clockwise according to the present invention.

Using the rotation of a layer corresponding to the detection position as an example, when the layer is rotated by 360 degrees, the shaft 11 at the corresponding layer is rotated by 360 degrees, and the third brush sheet 153 sweeps all the arc-shaped copper foils 6, so that the main control chipset detects a level change as shown in FIG. 9. Each peak in FIG. 8 corresponds to one arc-shaped copper foil 6, which means that a corresponding high level occurs when the layer is rotated by 90 degrees, and the main control chipset converts the level change into a digital signal for operation and storage, and finally sends the digital signal to an APP of an intelligent terminal through Bluetooth, so as to present the rotation of the corresponding layer of the intelligent magic cube.

Figure 10:
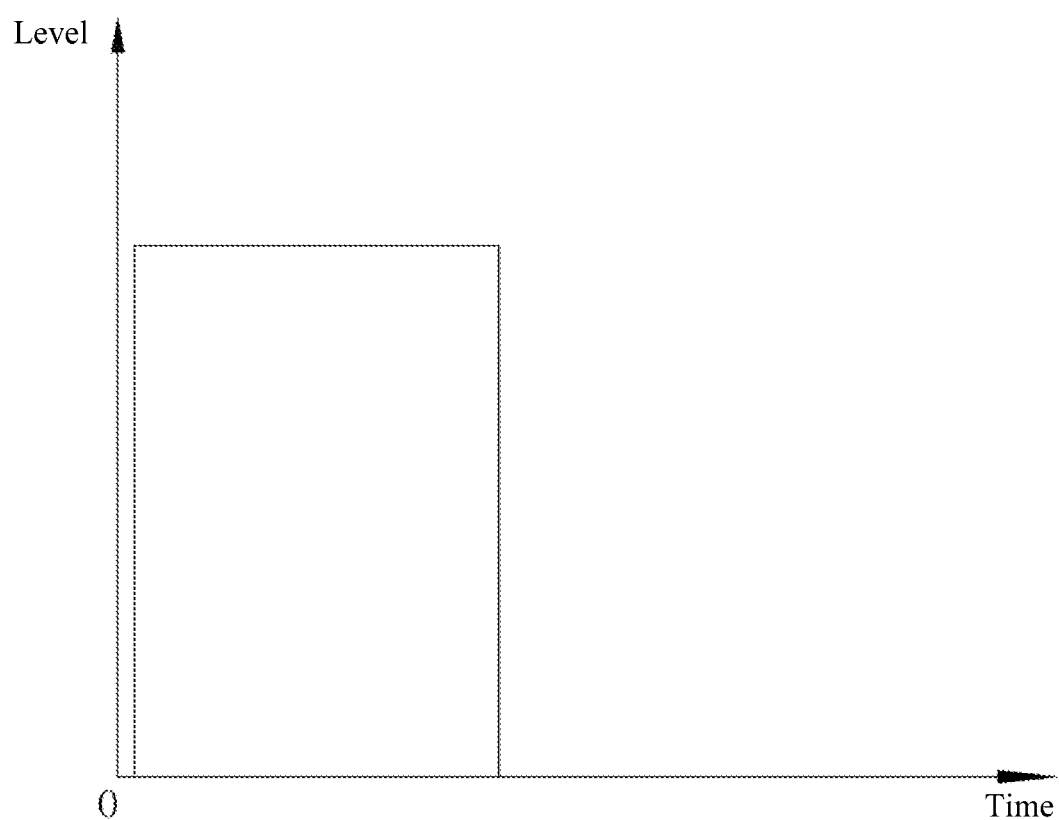
FIG. 10 is a diagram illustrating a level change detected by a main control chipset when a rotating shaft is rotated once in an arc-shaped copper foil range according to the present invention.

Similarly, using the rotation of a layer corresponding to the detection position as an example, if the layer is rotated by less than 90 degrees in the reverse direction, the level change detected by the main control chipset is shown in FIG. 10. In this case, the level change is converted into a digital signal, and the level change is defined, by using an algorithm built in the main control chipset, as a signal that indicates that the layer has been rotated but that is not to be sent to the intelligent terminal, so as to prevent incorrect presentation on the APP of the intelligent terminal.

It should be noted that a person skilled in the art is not limited to using the circuit designed in this embodiment to implement the level change as shown in FIG. 9 or FIG. 10 when the third brush sheet 153 sweeps the arc-shaped copper foil 6, and other circuits may be provided as long as the level change signal generated when the third brush sheet 153 sweeps the arc-shaped copper foil 6 can be normally recognized by the main control chipset.

The above descriptions are merely preferred embodiments of the present invention, and are not intended to limit the scope of the present invention. Any equivalent structural transformation made based on the description and the accompanying drawings of the present invention without departing from the concept of the present invention, or any direct/indirect application of the equivalent structural transformation in other related technical fields shall fall within the protection scope of the present invention.

What is claimed is:

1. A surface orientation sensing structure, comprising:

six printed circuit boards, wherein the printed circuit boards are electrically connected to each other and form a regular hexahedron, an outer surface of each of the six printed circuit boards is provided with a circular copper foil with a center at a center of the six printed circuit boards, four arc-shaped copper foils with a common center and equal radius are provided at equal intervals on a periphery of the circular copper foil, and the circular copper foil and the four arc-shaped copper foils have the same center; and six shafts each comprising a shaft body with a bottom, wherein the bottom of the shaft body is provided with a disc base, a bottom of the disc base is fixed with a chassis copper foil, and the chassis copper foil is provided with three brush sheets protruding toward one side of each of the six printed circuit boards, namely a first brush sheet, a second brush sheet, and a third brush sheet; where a through-hole is formed at a center of a circle on each of the six printed circuit boards, a convex column corresponding to the through-hole and penetrating through the chassis copper foil is provided at a center of a bottom surface of the disc base, and a respective one of the six shafts is inserted into the through-hole through the convex column, so as to be rotatably mounted on a respective one of the six printed circuit boards along a central axis thereof;

when the chassis copper foil is rotated with the respective one of the six shafts, sweeping paths of the first brush sheet and the second brush sheet are located at the circular copper foil and the first brush sheet and the second brush sheet are electrically connected to the respective one of the six printed circuit boards; in addition, a sweeping path of the third brush sheet covers the four arc-shaped copper foils, and when the third brush sheet sweeps the four arc-shaped copper foils, the third brush sheet is electrically connected to the respective one of the six printed circuit boards;

a main control chipset and a cell for supplying power to the main control chipset are provided in the regular hexahedron, the main control chipset is electrically connected to the circular copper foil, and when one of the six shafts is rotated, the main control chipset receives a level change signal caused when the third brush sheet sweeps the four arc-shaped copper foils; and the surface orientation sensing structure further comprises a spherical cover formed by closing upper and lower semi-spherical covers, the regular hexahedron is provided in the spherical cover, and the six shafts penetrate the spherical cover and extend beyond the spherical cover.

2. The surface orientation sensing structure according to claim 1, wherein a slit line of the spherical cover is located at a common horizontal plane of four of the six shafts, an upper semicircular tube and a lower semicircular tube are provided in each of positions corresponding to the four of the six shafts in the spherical cover, the upper semicircular tube is located at the upper semi-spherical cover, the lower semicircular tube is located at the lower semi-spherical cover, after the upper semi-spherical cover and the lower semi-spherical cover are closed, the upper semicircular tube and the lower semicircular tube are closed to form a circular tube for sleeving onto the shaft body, and the circular tube is sleeved with a spherical shaft.

3. The surface orientation sensing structure according to claim 2, wherein a cell slot for mounting a CR button cell is provided on an inner side of one of the six printed circuit boards on one surface of the regular hexahedron, and the spherical cover is provided with a cell access opening for removing or inserting the CR button cell at a position corresponding to the cell slot, and a bottom of the one of the six printed circuit boards, at the cell access opening, is cut off.

4. The surface orientation sensing structure according to claim 3, further comprising a cell cover for the cell access opening.

5. An intelligent magic cube, comprising a central shaft, six central blocks connected to the central shaft, twelve edge blocks embedded between every two of the six central blocks, and eight corner blocks embedded among every three of the twelve edge blocks, wherein the central shaft is the surface orientation sensing structure of the intelligent magic cube according to claim 1.

6. The intelligent magic cube according to claim 5, wherein a protrusion is provided at an end of each of the six shafts, and the protrusion is connected to a respective one of the six central blocks by an axis floating elasticity adjustment system.

7. The intelligent magic cube according to claim 5, wherein each of the eight corner blocks is provided with a first magnet on each of three sides adjacent to a respective one of the twelve edge blocks, and each of the twelve edge blocks is provided with a second magnet, corresponding to the first magnet, on each of two sides adjacent to a respective one of the eight corner blocks.

8. The intelligent magic cube according to claim 6, wherein each of the eight corner blocks is provided with a first magnet on each of three sides adjacent to a respective one of the twelve edge blocks, and each of the twelve edge blocks is provided with a second magnet, corresponding to the first magnet, on each of two sides adjacent to a respective one of the eight corner blocks.

* * * * *